United States Patent
Clausen et al.

(10) Patent No.: US 7,832,607 B2
(45) Date of Patent: Nov. 16, 2010

(54) VEHICLE MOUNTED BICYCLE RACK

(75) Inventors: Eivind Clausen, Bellingham, WA (US); James D. Allsop, Bellingham, WA (US)

(73) Assignee: Softride, Inc., Bellingham, WA (US)

( * ) Notice: Subject to any disclaimer, the term of this patent is extended or adjusted under 35 U.S.C. 154(b) by 234 days.

(21) Appl. No.: 11/923,443

(22) Filed: Oct. 24, 2007

(65) Prior Publication Data

US 2008/0093404 A1    Apr. 24, 2008

Related U.S. Application Data

(60) Provisional application No. 60/854,129, filed on Oct. 24, 2006.

(51) Int. Cl.
*B60R 9/10* (2006.01)
(52) U.S. Cl. .................. 224/506; 224/502; 224/504; 224/924
(58) Field of Classification Search ................ 224/506, 224/504, 495, 502, 924, 503; 403/151, 154
See application file for complete search history.

(56) References Cited

U.S. PATENT DOCUMENTS

| | | | |
|---|---|---|---|
| 2,512,267 A | | 6/1950 | Donnelley |
| 4,207,794 A | * | 6/1980 | Collister ..................... 411/340 |
| 4,367,872 A | * | 1/1983 | Langston ..................... 473/63 |
| 4,400,129 A | * | 8/1983 | Eisenberg et al. ........... 414/462 |
| 4,830,250 A | | 5/1989 | Newbold |
| 5,181,822 A | | 1/1993 | Allsop |
| 5,211,323 A | | 5/1993 | Chimenti |
| 5,244,133 A | | 9/1993 | Abbott |
| 5,259,542 A | * | 11/1993 | Newbold et al. ............ 224/324 |
| 5,303,857 A | | 4/1994 | Hewson |
| 5,330,312 A | | 7/1994 | Allsop |
| 5,443,189 A | * | 8/1995 | Hirschfeld .................. 224/501 |
| 5,527,146 A | * | 6/1996 | Allsop et al. ................ 414/462 |
| 5,570,825 A | | 11/1996 | Cona |
| 5,573,165 A | | 11/1996 | Bloemer |
| 5,593,076 A | | 1/1997 | Biondo |
| D378,289 S | | 3/1997 | Lundgren |
| 5,658,119 A | | 8/1997 | Allsop |
| 5,662,256 A | * | 9/1997 | Bryan ........................ 224/523 |
| 5,664,717 A | | 9/1997 | Joder |
| 5,685,469 A | * | 11/1997 | Stapleton .................... 224/505 |
| 5,685,686 A | * | 11/1997 | Burns ......................... 414/462 |

(Continued)

FOREIGN PATENT DOCUMENTS

GB    2425997 A  * 11/2006

(Continued)

*Primary Examiner*—Nathan J Newhouse
*Assistant Examiner*—John Cogill
(74) *Attorney, Agent, or Firm*—Christensen O'Connor Johnson Kindness PLLC

(57) ABSTRACT

A bicycle support rack adapted to be mounted in a hitch receiver of a vehicle including a hollow upstanding tube having a parallel rod running therethrough, both extending from a lower hitch bar upwardly to a top plate. The top plate supporting a pair of rearwardly extending arms upon which one or more bicycles may be mounted for carrying by the vehicle. The tube and internal parallel rod both being adapted to pivot rearwardly while maintaining the bicycle supporting arms in a substantially parallel orientation with the vehicle hitch receiver. The tilting movement of the rack providing improved access to the rear of the vehicle.

4 Claims, 18 Drawing Sheets

U.S. PATENT DOCUMENTS

| | | | |
|---|---|---|---|
| 5,690,260 A * | 11/1997 | Aikins et al. | 224/505 |
| 5,730,345 A * | 3/1998 | Yeckley et al. | 224/505 |
| 5,775,555 A | 7/1998 | Bloemer | |
| 5,775,560 A | 7/1998 | Zahn | |
| 6,206,259 B1 * | 3/2001 | Brungardt et al. | 224/497 |
| 6,401,999 B1 * | 6/2002 | Hehr | 224/502 |
| 6,431,423 B1 | 8/2002 | Allen | |
| 6,655,562 B2 * | 12/2003 | Jeong | 224/282 |
| 6,772,927 B2 * | 8/2004 | Bogoslofski | 224/324 |

FOREIGN PATENT DOCUMENTS

WO    2006004519 A1    1/2006

Figure 3:
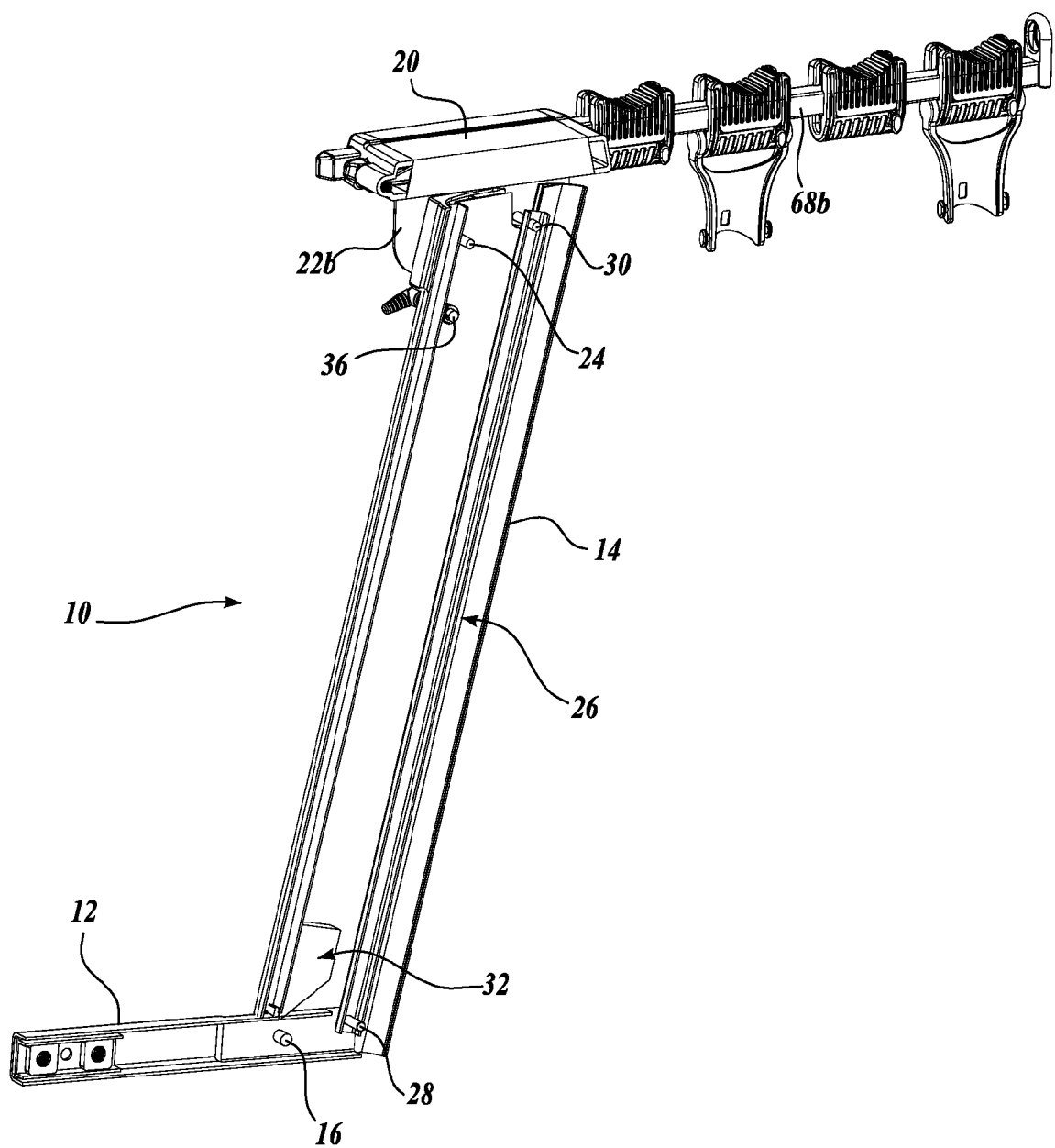
Figure 4:
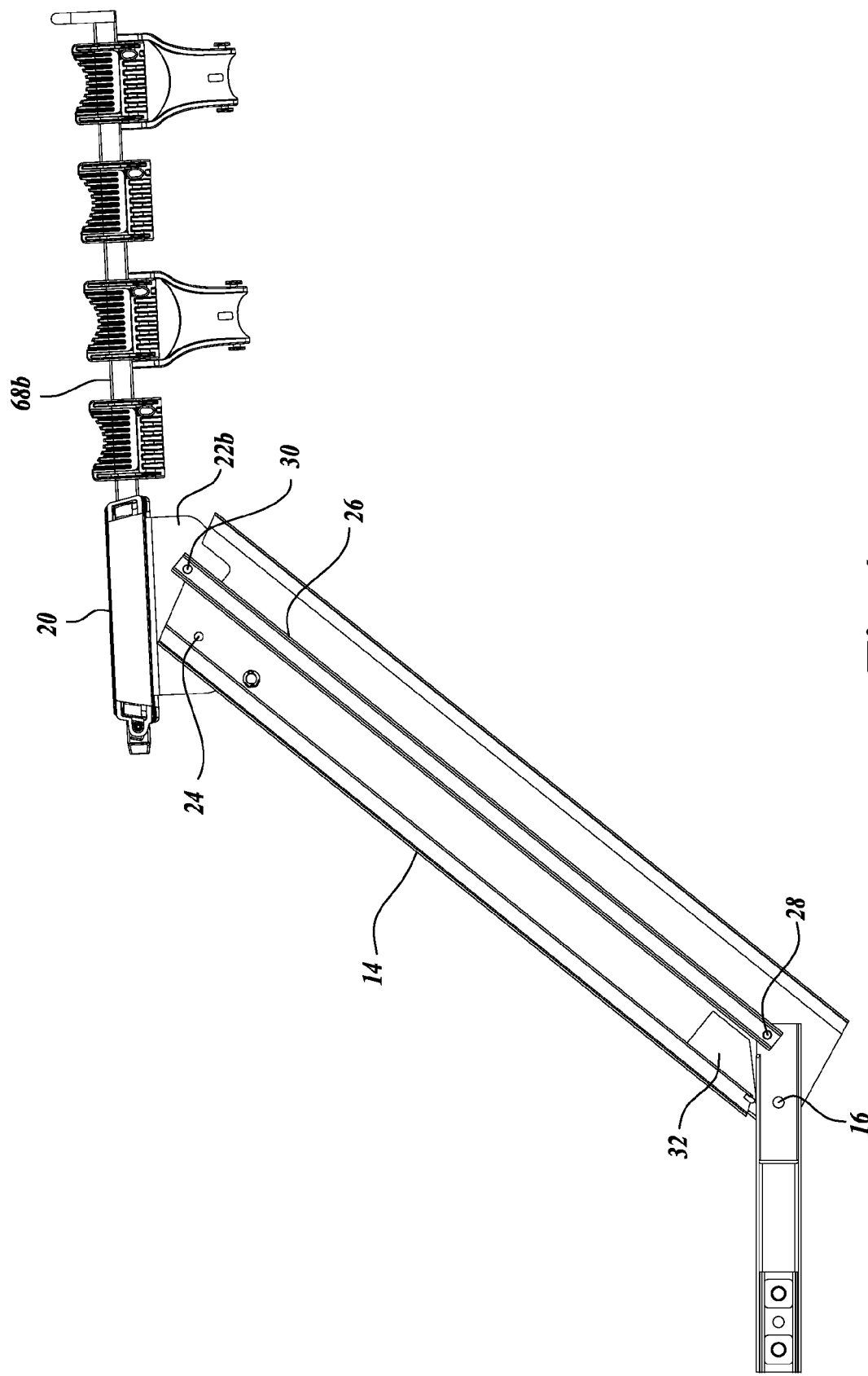
Figure 5:
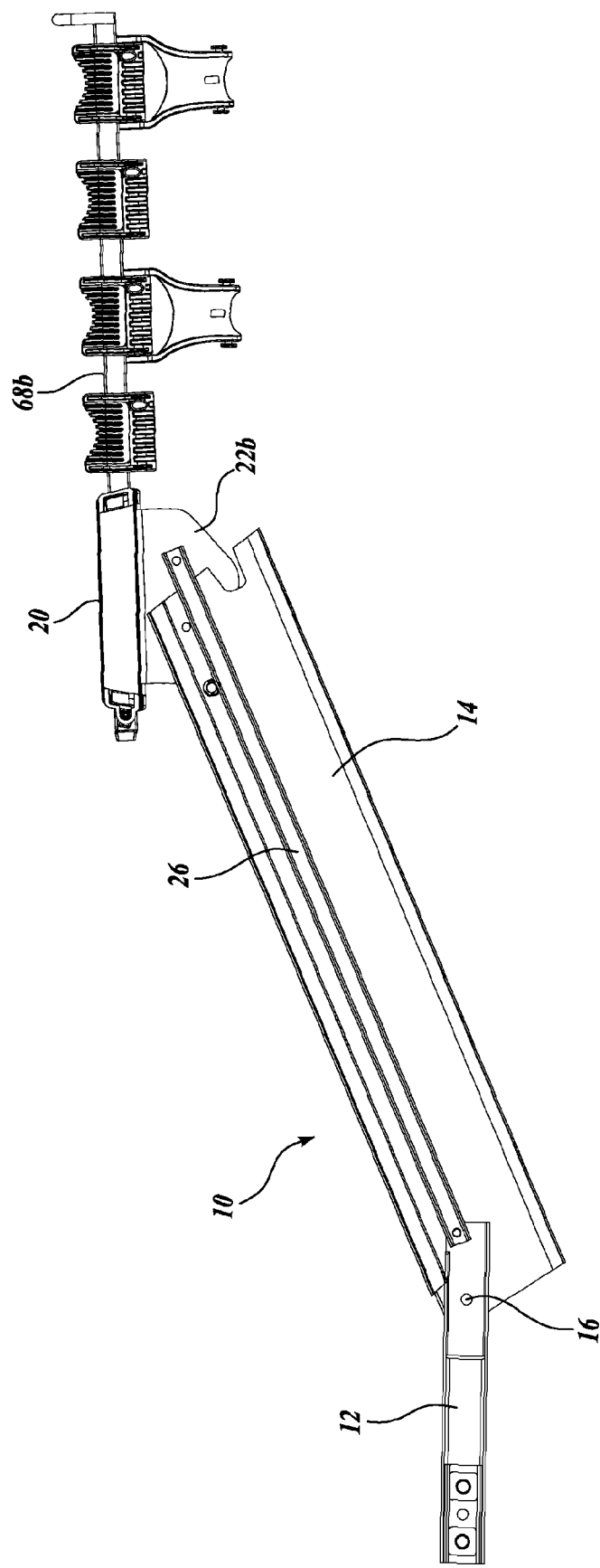
Figure 8:
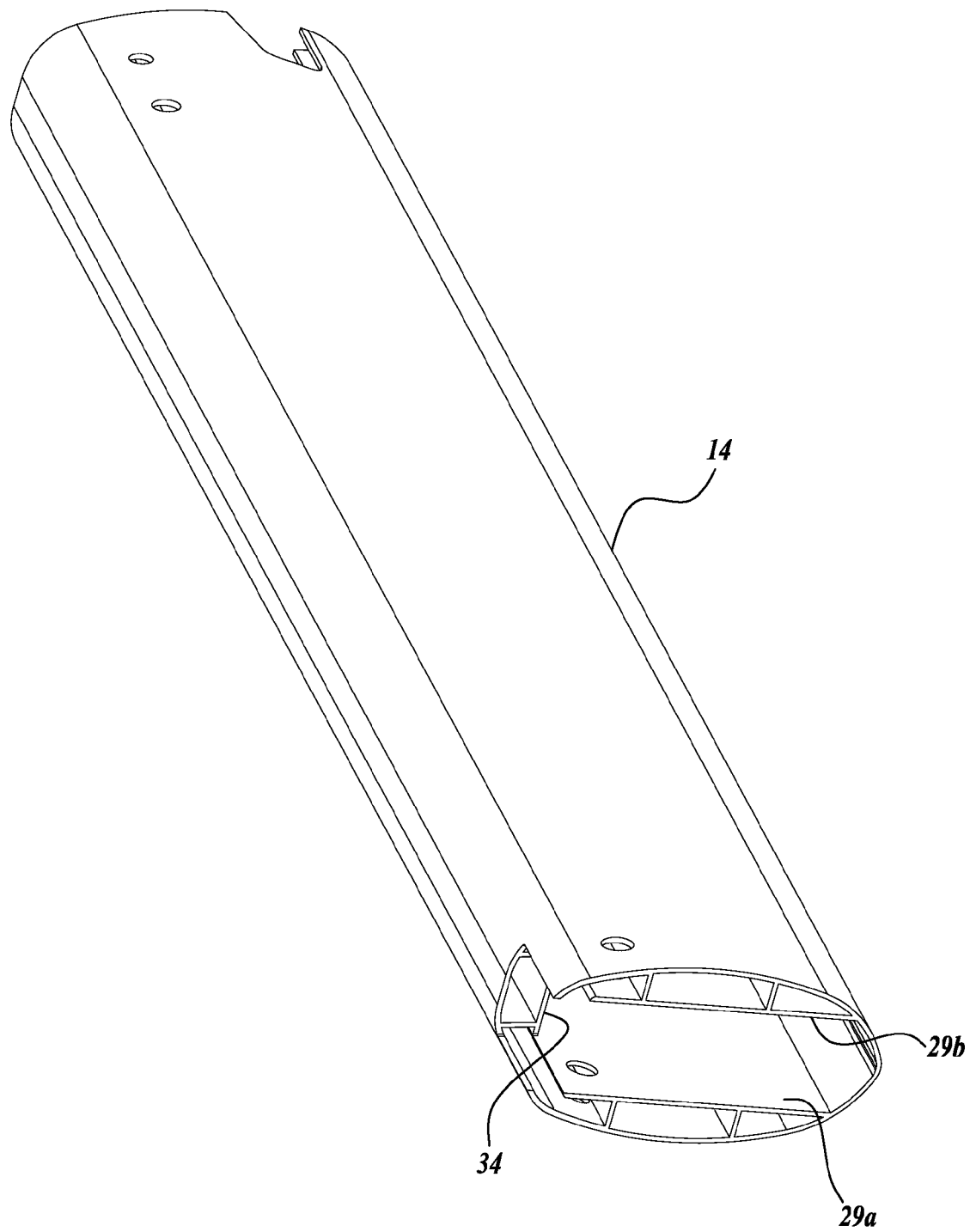

* cited by examiner

VEHICLE MOUNTED BICYCLE RACK

CROSS-REFERENCE TO RELATED APPLICATION

This application claims the benefit of U.S. Provisional Patent Application No. 60/854,129, filed Oct. 24, 2006, the subject matter of which is incorporated herein by reference.

BACKGROUND

Rearwardly tiltable vehicle hitch mounted support racks are known. See, for example, U.S. Pat. Nos. 5,181,822, 5,527,146 and 5,658,119. In addition, tiltable racks having a fixed rod positioned within a pivoting outer tube are known as shown in U.S. Pat. No. 6,401,999. In the latter patent, the structure within the hollow tube is difficult to construct and costly to manufacture. In particular, in the '999 patent, the internal rod is fixedly connected by upper and lower crank links via pins to flanges mounted on the top and bottom portions of the rack while the external tube pivots rearwardly until pivoting is prevented by stop plate 70 as shown in FIG. 5 of the '999 patent.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A vehicle mounted carrying rack wherein an upright hollow tube and an internal rod are adapted to pivot rearwardly with respect to a hitch bar mounted on the vehicle while remaining substantially parallel to each other at all times. A top plate is connected to both the hollow tube and the parallel rod near their upper ends such that load support arms extending from the top plate remain substantially parallel to the hitch bar at all times during rearward pivoting. The load support arms are removably held in place in the top plate by means of a pin which may be spring loaded. Anti-sway saddles and stabilizers are mounted on the support arms to receive and hold the top beam of a bicycle to be carried. A support beam may also be included within the hollow tube for added strength and durability.

DESCRIPTION OF THE DRAWINGS

The foregoing aspects and many of the attendant advantages of this invention will be more readily appreciated as the same become better understood by reference to the following detailed description, when taken in conjunction with the accompanying illustrations, wherein:

FIG. 1 is a right side perspective view of the vehicle mounted bicycle rack of the present invention;

FIG. 2 is a left side perspective view of the rack of FIG. 1;

FIG. 3 is a section view taken along line 3-3 in FIG. 1;

FIG. 4 is a section view taken along line 3-3 in FIG. 1;

FIG. 5 is a section view taken along line 3-3 in FIG. 1 showing the rack in a further inclined position and with the stop element removed;

FIG. 6 is an exploded view of the rack of FIG. 1;

FIG. 7 is an exploded and enlarged view of the top plate portion of the rack shown in FIG. 6;

FIG. 8 is a perspective view of the hollow support tube showing one embodiment of its internal construction;

FIG. 9 is a section view of the spring lock of FIG. 7;

FIG. 10 is a perspective view of the top plate portion of the rack with a side portion cut away to show one of the internal extruded plastic sleeves in which the support arms are mounted;

FIG. 11 is a perspective view of the top plate again showing the location of the internal extruded plastic sleeves of FIG. 10;

FIG. 12 is a partial perspective view of a support arm and anti-sway saddle and stabilizer;

FIG. 13 is a section view of the anti-sway saddle and stabilizer of FIG. 12 taken along lines 13-13, showing the stabilizer in its vertical, unlocked position; and, FIG. 14 shows the anti-sway saddle and stabilizer of FIG. 13 in its locked position.

FIG. 15 is an exploded view of a second embodiment of the present invention including a reinforcing rod.

FIG. 16 is a bottom partial perspective view showing the reinforcing rod in place within the hollow support tube.

FIG. 17 is a partial top perspective view showing the reinforcing rod in place within the hollow support tube.

FIG. 18 is a perspective view of a midline section of the second embodiment.

DETAILED DESCRIPTION

Referring initially to FIGS. 1 and 2, a bicycle support rack 10 including a hitch receiver bar 12 adapted to be mounted in a hitch receiver mounted on the rear of a vehicle is disclosed. As will be understood, a conventional hitch receiver bar slips into a cavity formed by a hitch receiver and is held in place by means of bolts or other devices typically extending through aligned holes in both the hitch receiver and the hitch receiver bar. Referring additionally to FIGS. 3-6, bicycle support rack 10 further includes an upright hollow tube 14 pivotally mounted to hitch receiver bar 12 by means of laterally extending member 16 which, in one embodiment, may comprise a conventional nut and bolt extending through a pair of beveled washers 18 which conform to the curved outer surface of tube 14. In a preferred embodiment, tube 14 is formed from aluminum, but, it will be understood that other metals or plastic or carbon fiber may also be used to form the tube.

Tube 14 extends upwardly to top plate 20 where it is pivotally connected to a pair of flanges 22*a* and 22*b* by means of laterally extending member 24 which may comprise a nut and bolt combination.

Positioned within upright hollow tube 14 is rod 26. Rod 26 extends between hitch receiver bar 12 and flanges 22*a* and 22*b* and is mounted to pivot with respect thereto by means of laterally extending member 28 which may comprise a lower pivot pin, and upper laterally extending member 30 which may also comprise a nut and bolt combination. Member 28 may be a free floating pin which is held in place by the interior side walls 29*a* and 29*b* of Tube 14 (FIG. 8). As so mounted, rod 26 and tube 14 remain substantially parallel to each other at all times while the bicycle support rack is pivoted from its near upright position to an inclined position as will be seen in FIGS. 3-5. Tube 14 and rod 26 form the long edges of a parallelogram, the top and bottom edges of which are formed by flanges 22*a* and 22*b* and hitch receiver bar 12, respectively. Thus, it will be understood that the distances between top pins 22 and 24 and bottom pins 16 and 28 always remain substantially the same, thus causing top plate 20 to maintain its substantially parallel orientation with respect to hitch receiver bar 12.

A stop block 32 is shown mounted within tube 14 near its base. As best shown in FIG. 4, as bicycle support rack 10 pivots rearwardly with respect to the vehicle in which it is mounted, block 32 eventually comes in contact with both the forward internal edge of tube 14 and the forward edge of rod 26 so as to prevent further rearward pivoting of the rack. It will be understood that when one or more bicycles are mounted on the rack, stop block 32 could prevent the downwardly extending bicycles from contacting the ground. It is contemplated, however, as shown in FIG. 5, that block 32 may be removed to allow rack 10 to pivot even lower to provide even greater access to the rear of a vehicle. Stop block 32 includes an upwardly extending flange in its bottom left corner as seen in FIG. 3 which defines a slot which is adapted to slide onto internal flange 34 (FIG. 8) of hollow tube 14 where it is held in place by the proximity of the upper surface of hitch receiver bar 12. It will be understood that the stop block 32 may be removed from within the tube by removing nut and bolt combination 16 and rotating the rack such that the bottom of tube 14 is exposed and allowing the stop block to be withdrawn from within the tube.

Figure 6:
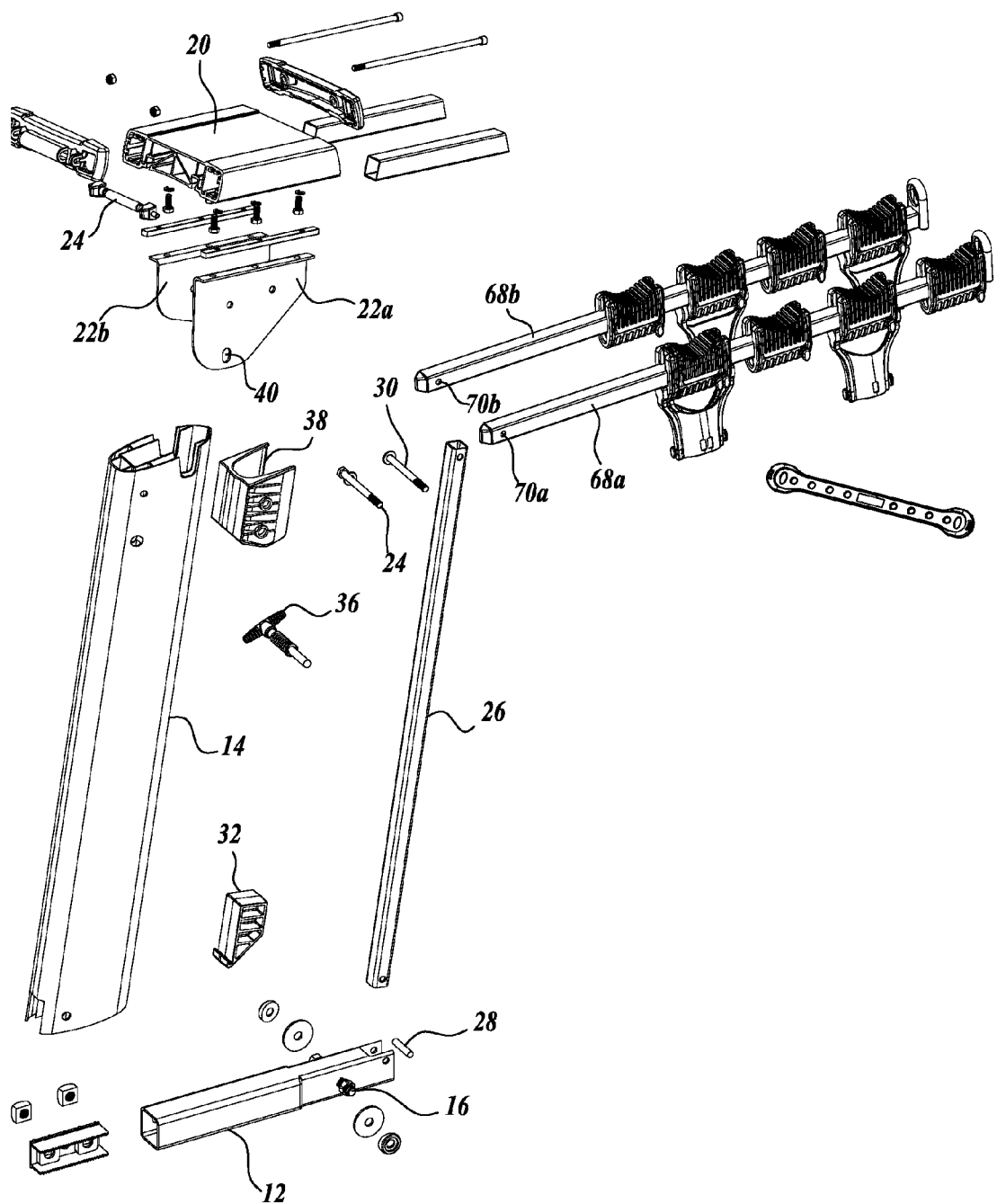

Referring to FIG. 6, a conventional pull pin 36 is shown mounted to extend through the sidewalls of tube 14 and into pull pin hole 40 in flange 22a. As best seen in FIG. 6, pull pin 36 includes a handle mounted on a rod which carries a spring such that pull pin 36 is normally biased into hole 40 when the support rack is in its upright position thus preventing rearward pivoting of the support rack. When it is desired to pivot the rack rearwardly, the pull pin handle is grasped and pulled outwardly to remove it from hole 40 which allows the support rack to pivot.

Figure 1:
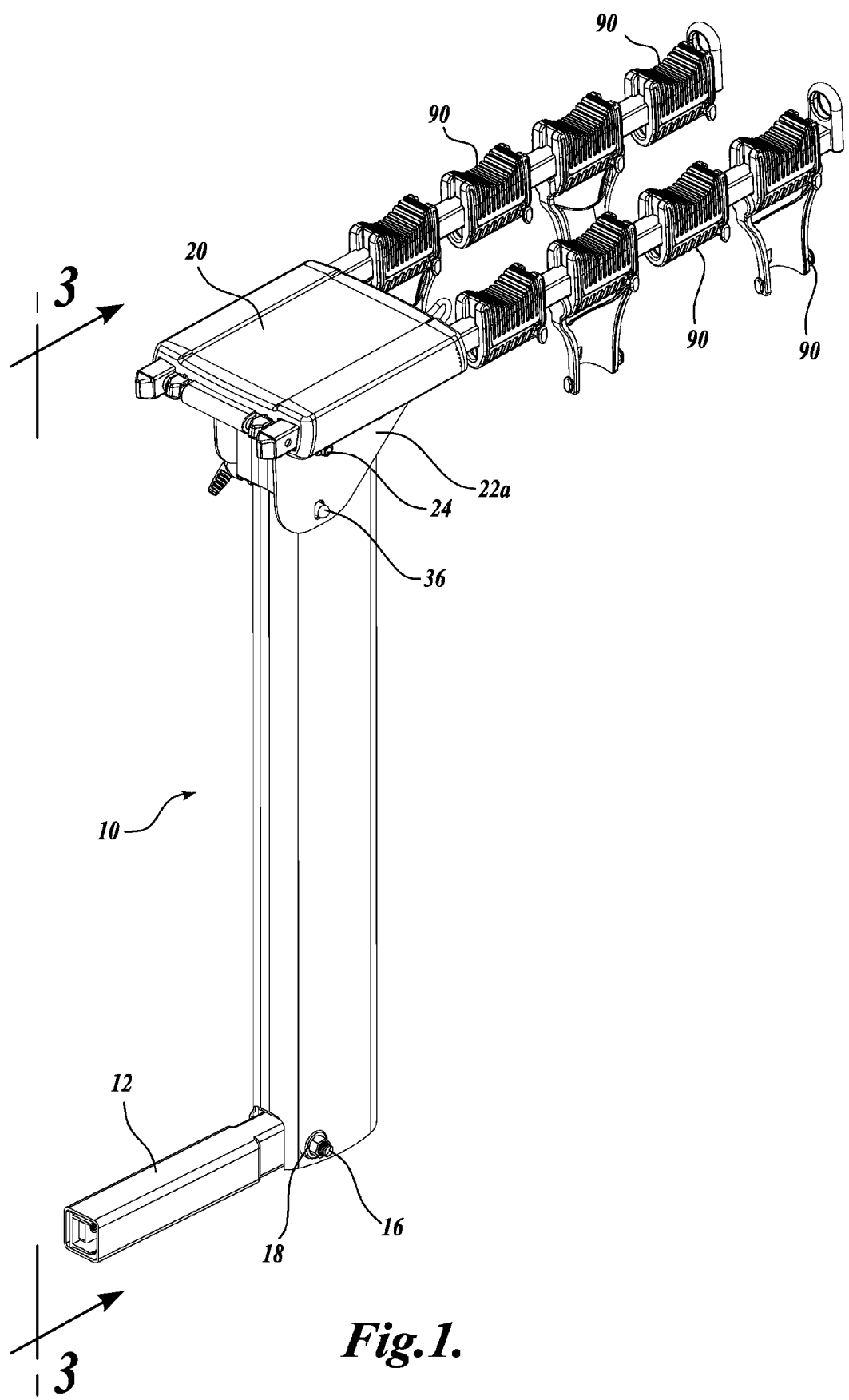
Figure 2:
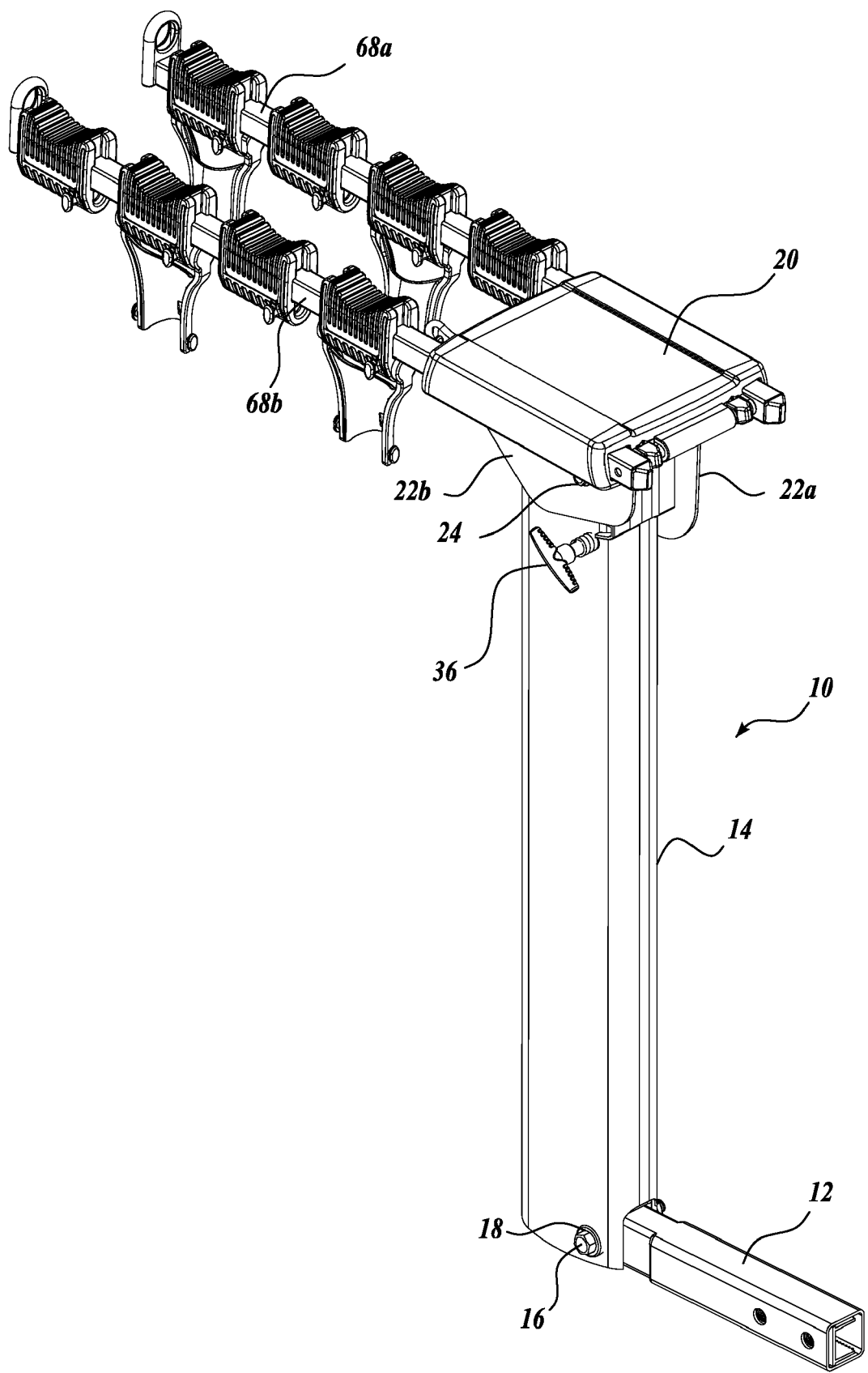
Figure 7:
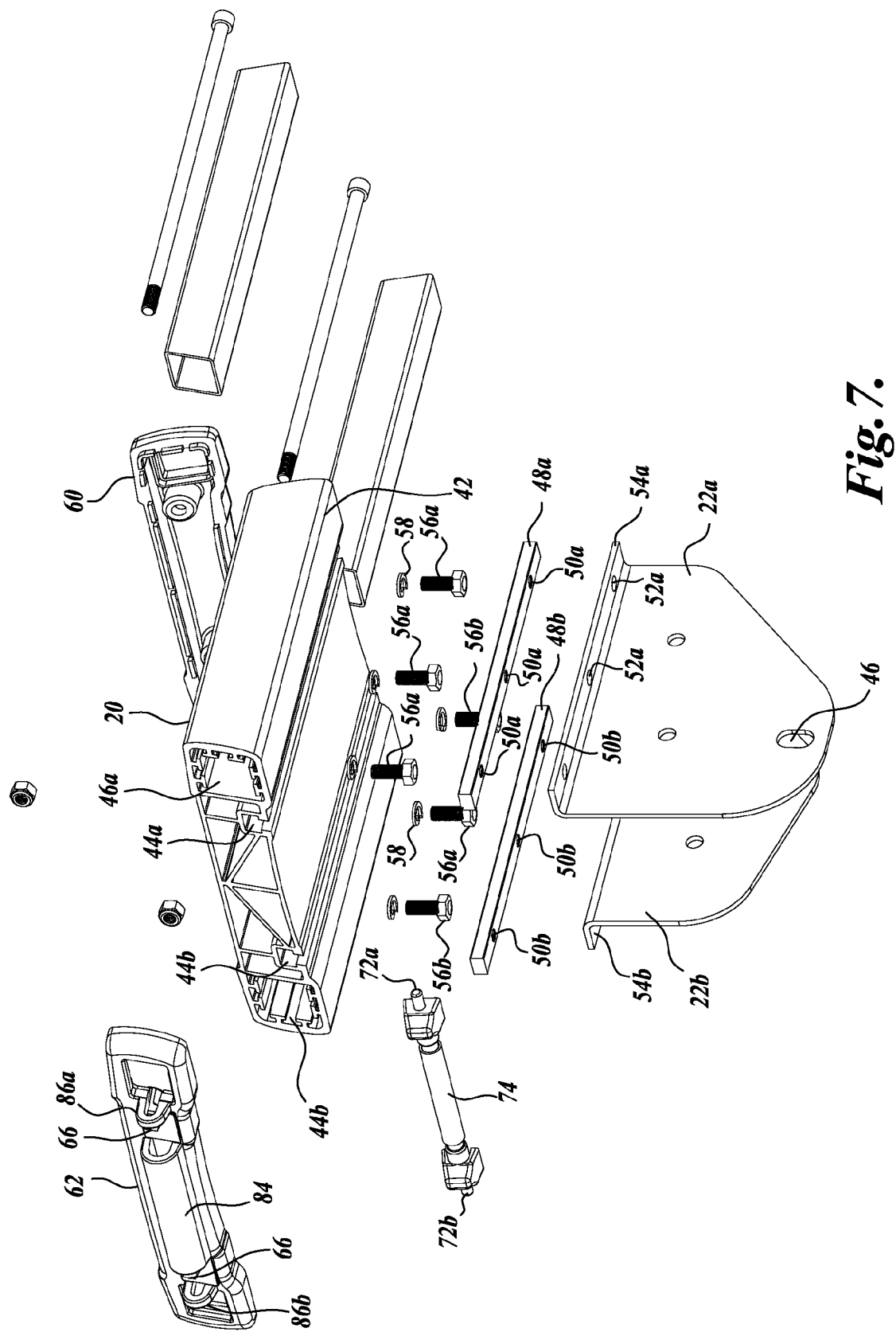

As best shown in FIG. 7, flange 22a is shaped differently from flange 22b whereby flange 22a includes a lower shoulder portion in which pull pin hole 40 is formed. As can be seen in FIG. 2, the pull pin handle is positioned adjacent flange 22b while its distal end extends through enlarged flange 22a.

Double shim 38 is mounted on the outer surface of tube 14 to receive both the shaft of pull pin 36 and nut and bolt combination 24. Double shim 38 may be formed of a somewhat rigid plastic material. When mounted on tube 14, the shim provides a pair of flat planes which make planar contact with the inner surfaces of flanges 22a and 22b.

The construction and mounting of one embodiment of top plate 20 is best seen with reference to FIG. 7. Top plate 20 includes a cast element 42 which includes a pair of nut bar receiving slots 44a and 44b, and a pair of support arm receiving slots 46a and 46b. Nut bars 48a and 48b each including three threaded holes 50a and 50b spaced to correspond to bolt receiving holes 52a and 52b in outwardly extending flanges 54a and 54b of elements 22a and 22b. To connect top plate 20 to flanges 52, nut bars 48a and 48b are slipped within slots 44a and 44b and bolts 56a and 56b are inserted upwardly through holes 52a and 52b and threaded into bolt receiving holes 50a and 50b. Conventional lock washers 58 may be used to prevent inadvertent loosening. It will be understood that the use of this nut bar construction eliminates the need to drill possibly weakening holes into the cast top plate 20.

Nut bars 48a and 48b are held in place by end caps 60 and 62, which are in turn held in place on top plate 20 by conventional long bolts (not shown) extending through bolt mounts 64 in end cap 60 into conventional nuts held in nut pockets 66 provided in end cap 62.

Load support arms 68a and 68b are removably mounted in top plate 20 by inserting them through support arm receiving slots 46a and 46b. The load support arms each include holes 70a and 70b (FIG. 6) adapted to receive the pin ends 72a and 72b of spring loaded support arm lock 74.

Figure 9:
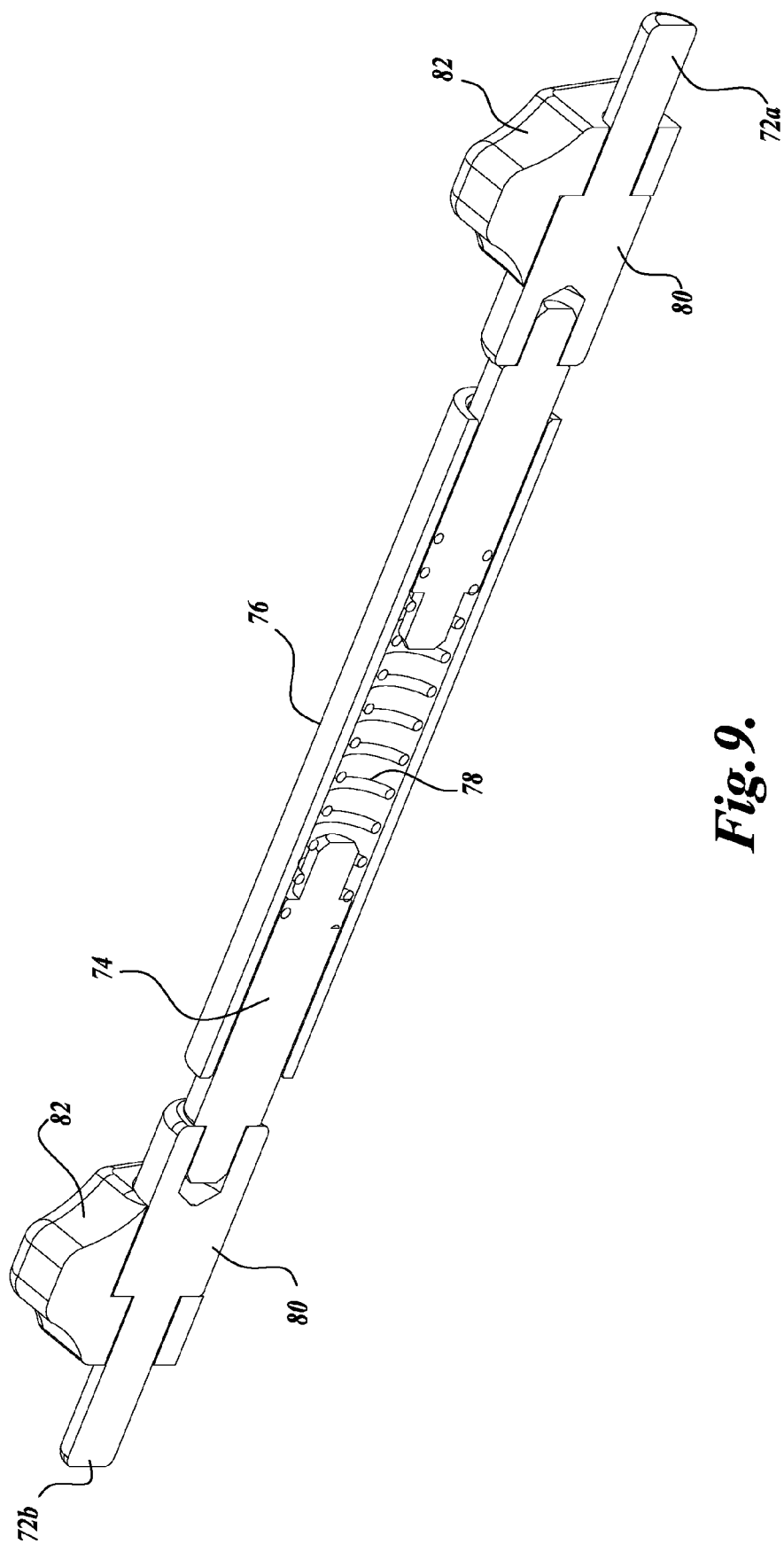
Figure 10:
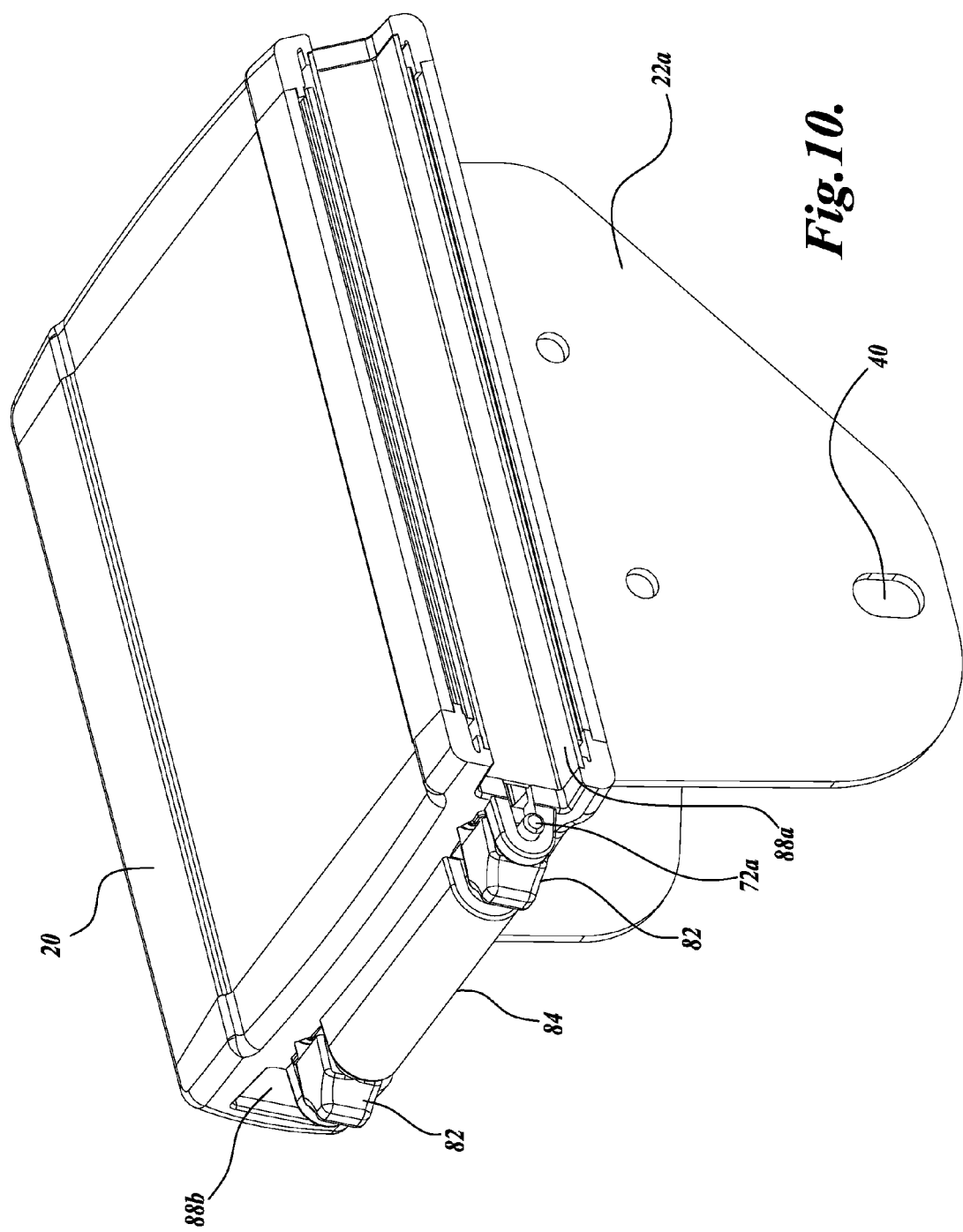
Figure 11:
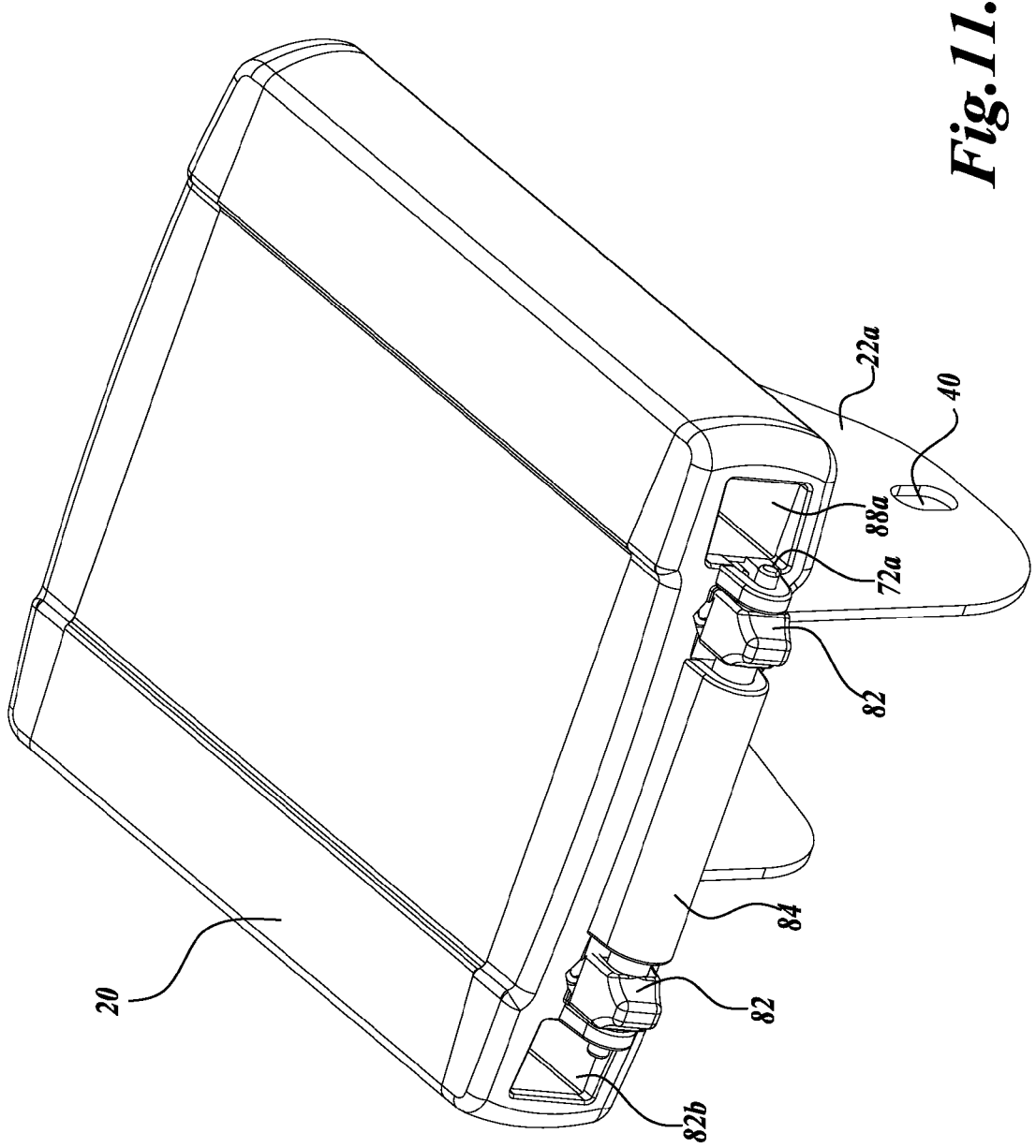

Referring additionally to FIGS. 9-11, spring loaded arm lock 74 is shown to include a central tube portion 76, an internal spring 78, and a pair of pins 80 cooperatingly mounted with spring 78 and extending outwardly of each end of tube 76. Finger grips 82 are provided on each end of pin 80 such that they may be easily gripped and moved laterally inward to compress spring 78.

End cap 62 includes an arched fitting 84 in which the tube portion of arm lock 74 is mounted such that the pin ends 72a and 72b extend outwardly through guides 86a and 86b and thence into armholes 70a and 70b when the support arms 68a and 68b are inserted into receiving slots 46a and 46b, respectively. Spring 78 biases pin ends 72a and 72b within the armholes 70a and 70b to hold the arms in place within the top plate. However, it will be understood that simple movement of the finger grips 82 toward each other will withdraw pin ends 72a and 72b from the armholes releasing the support arms.

FIGS. 10 and 11 disclose extruded plastic sleeves 88a and 88b which may be inserted within the arm receiving slots 46a and 46b to prevent metal to metal contact between the load supporting arms and the top plate.

Figure 12:
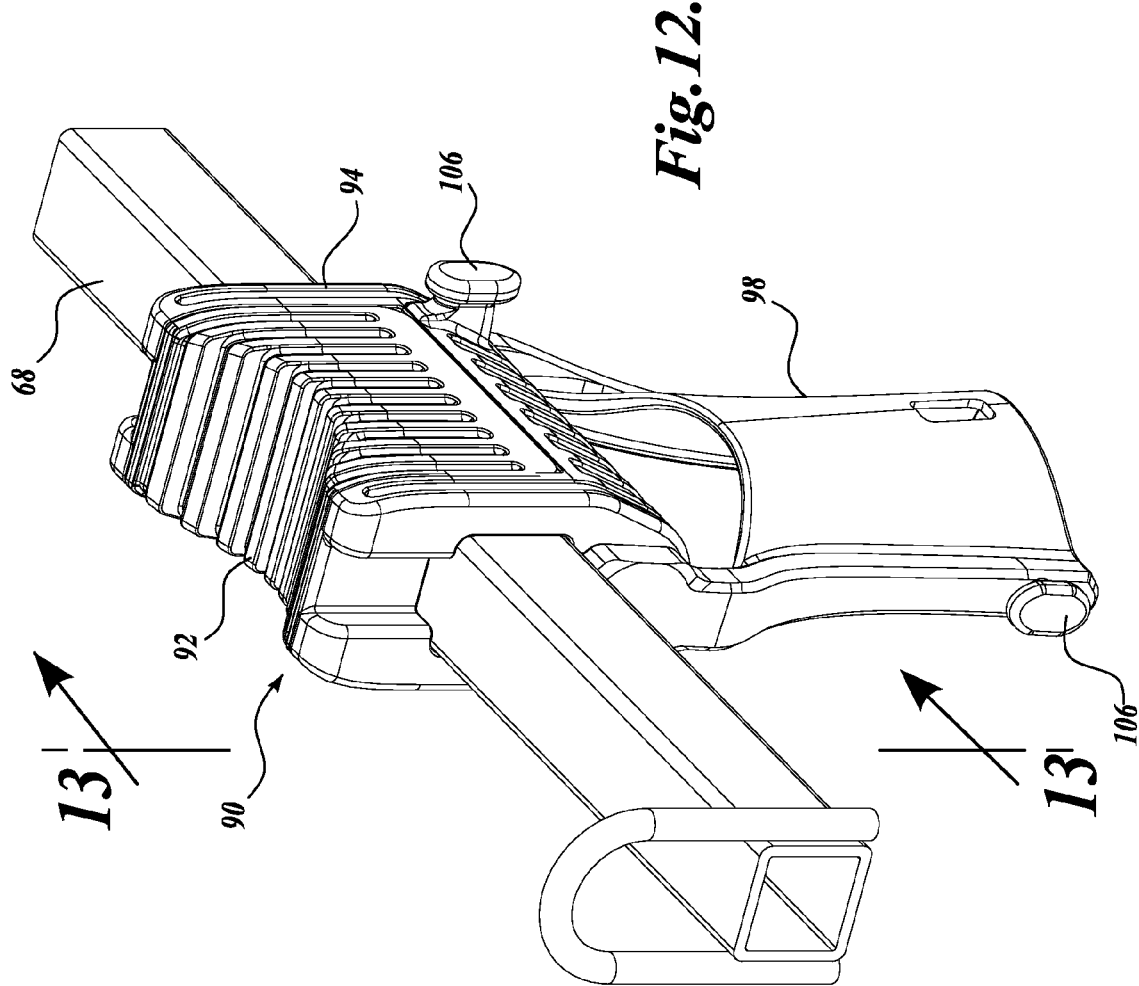
Figure 13:
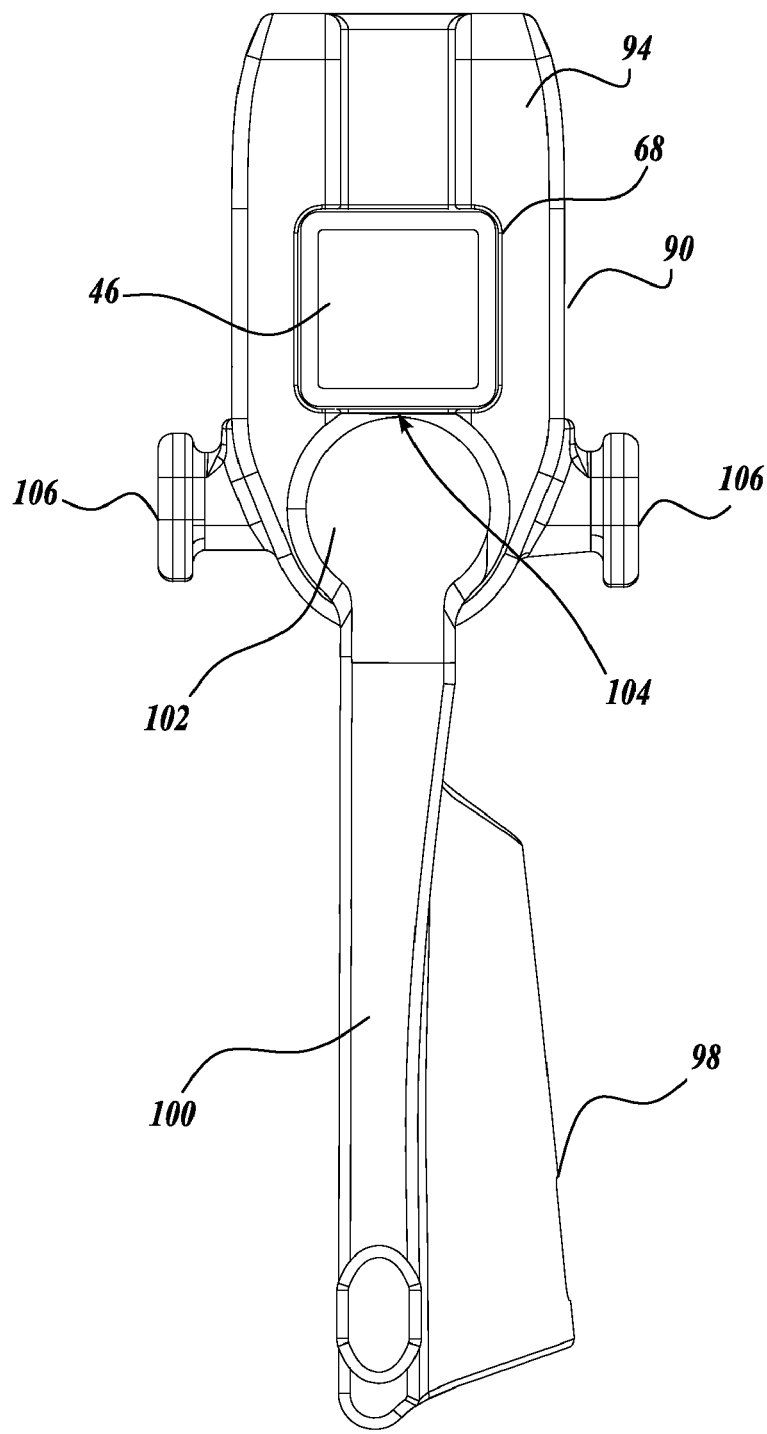
Figure 14:
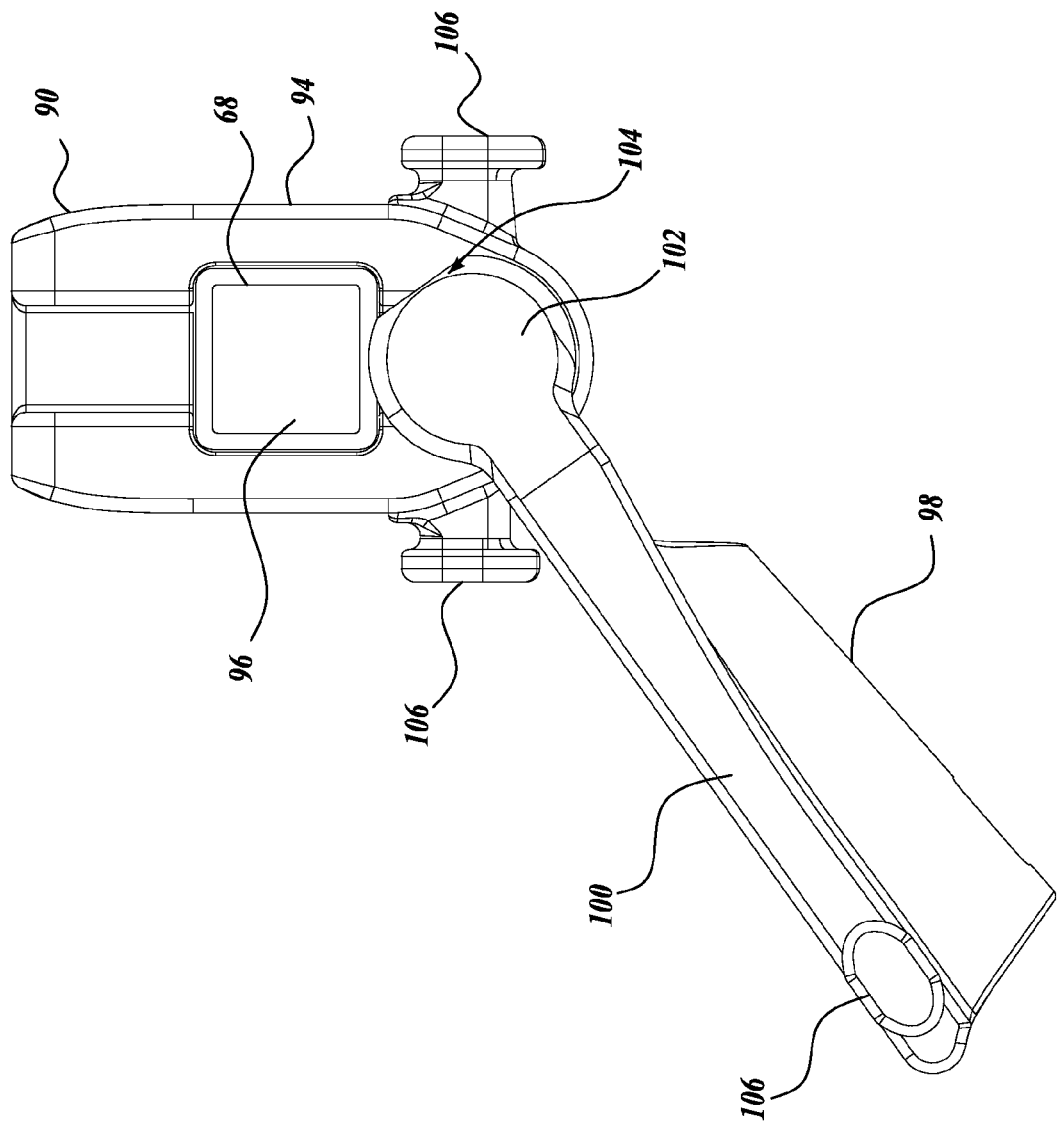
Figure 15:
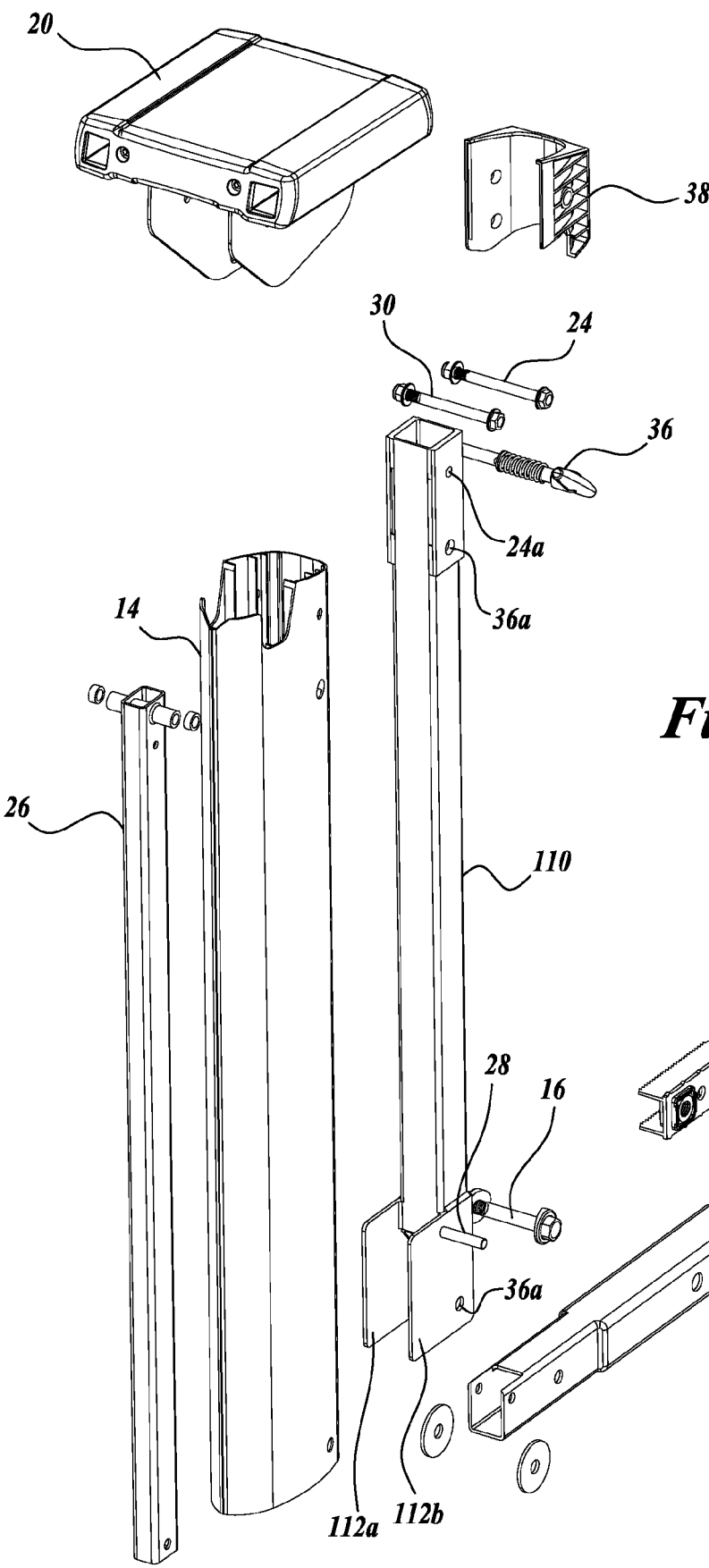

Referring additionally to FIGS. 12-14, an anti-sway device 90 is shown mounted on a support arm 68 to reduce swaying motion of bicycles mounted on the support rack while a vehicle is in motion. The anti-sway device includes a saddle portion 92 which may be molded from relatively soft rubber and include a downward curvature formed by a plurality of upstanding fingers adapted to receive the top tube of a bicycle. Saddle portion 92 is mounted and held by saddle support 94 which is preferably made of a somewhat firmer plastic-like material. Both saddle 92 and saddle support 94 include a central opening 96 adapted to receive a support arm 68.

Downwardly extending from saddle support 94 is an anti-sway stabilizer 98 which includes a lower portion 100 and a ball-like upper portion 102.

As best seen in FIGS. 13 and 14, ball 102 includes a flat upper portion 104. In FIG. 13, anti-sway stabilizer 98 is substantially vertical in orientation such that flat upper portion 104 lies adjacent support arm 68. In FIG. 14, anti-sway stabilizer 98 is rotated to a locked position wherein the shoulder of ball-like upper portion 102 is pressed against the lower portion of arm 68 thus preventing movement of the anti-sway stabilizer along arm 68. When not in the locked position, stabilizer 90 may be moved longitudinally along arm 68 so that it may be positioned at appropriate spacing from other anti-sway stabilizers mounted on the bicycle support arms. Strap receiving buttons 106 are provided on both the saddle support 94 and the lower portion of the anti-sway stabilizer 100 to receive conventional slotted straps which may be wrapped around the bicycle being carried by the support arms to hold it in place.

Figure 16:
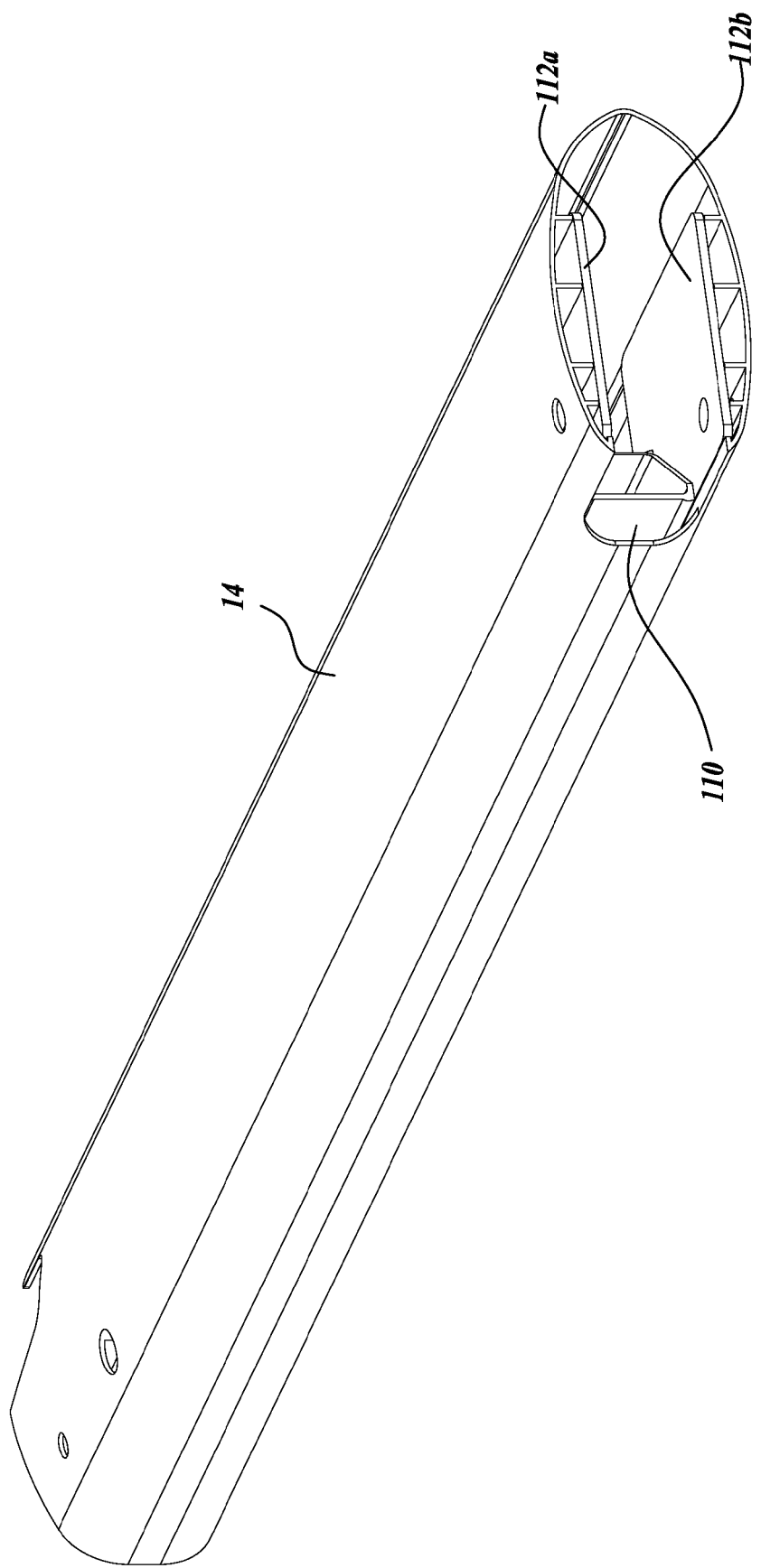
Figure 17:
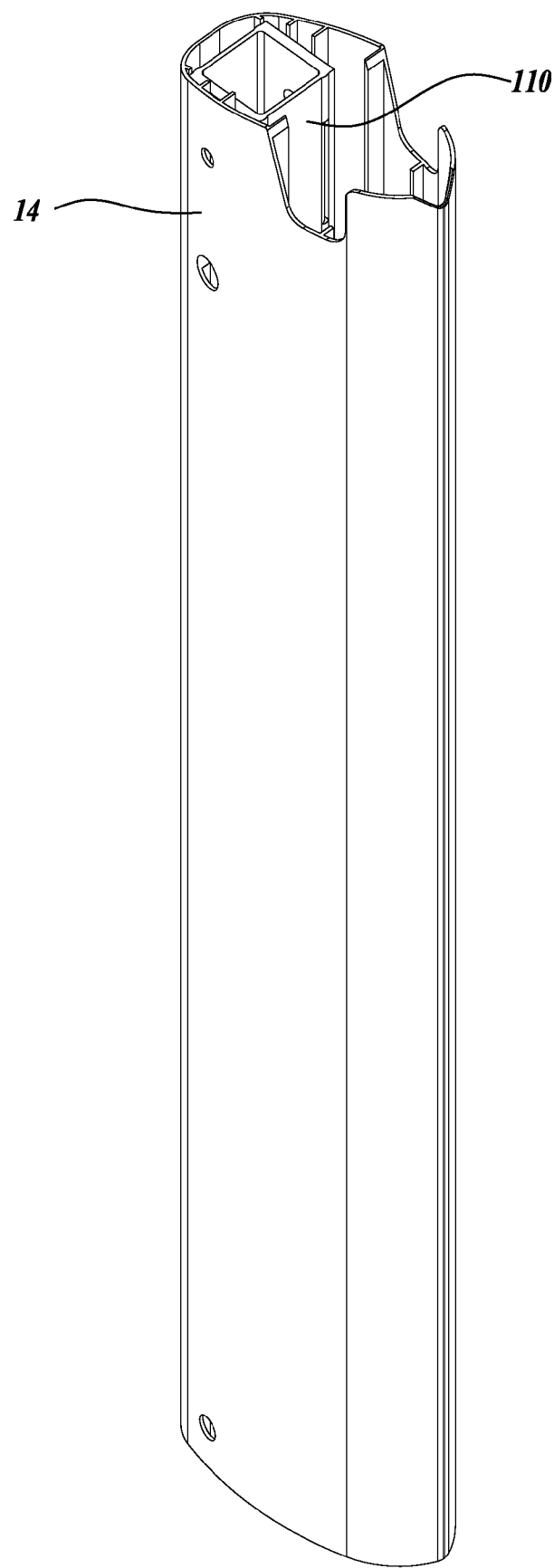
Figure 18:
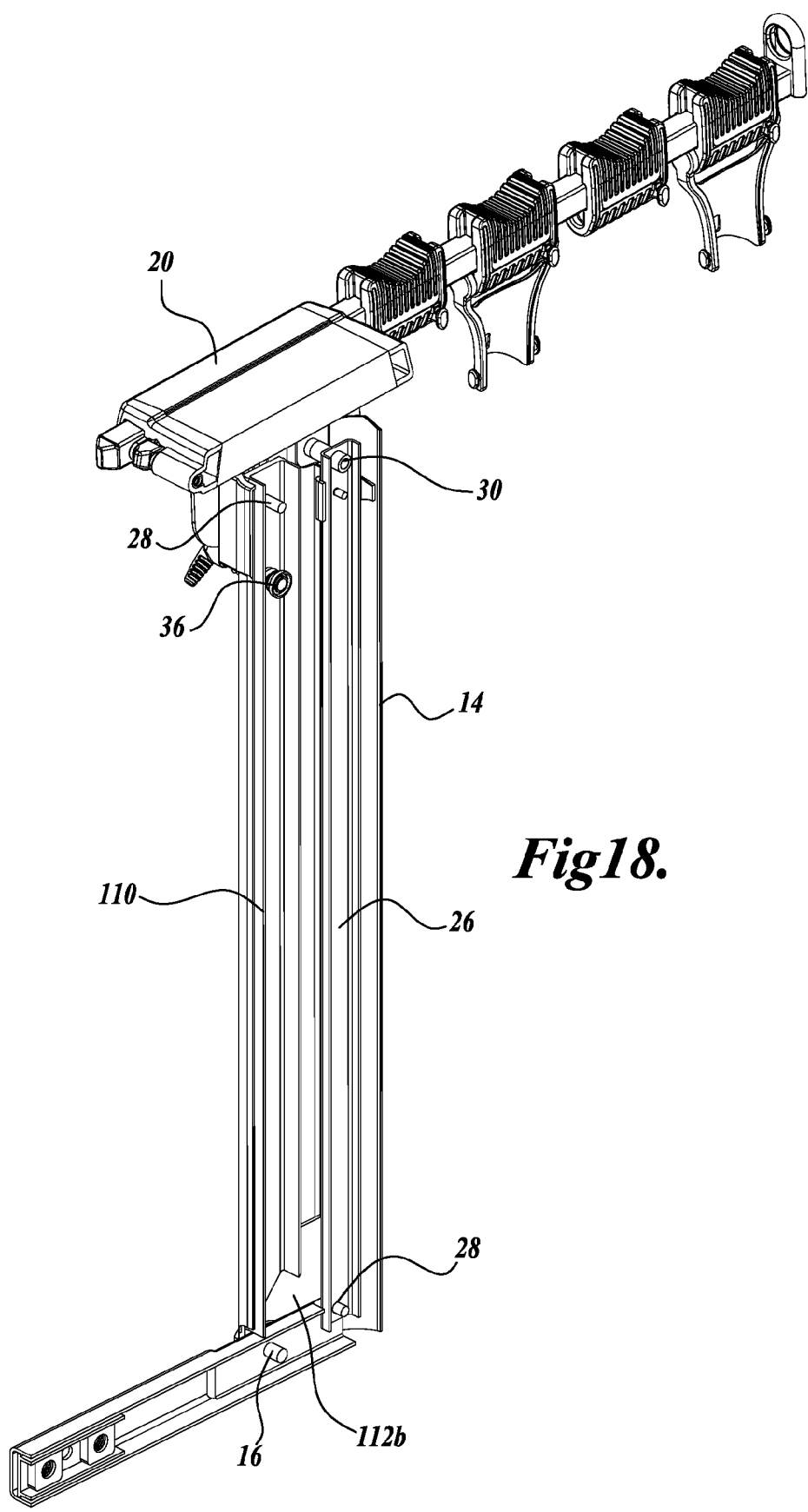

Turning now to FIGS. 15-18, a second embodiment of the present invention is disclosed to include an internal metal reinforcing beam 110 which is shown to be of rectangular cross-section. As also shown in FIGS. 16-18, beam 110 is positioned within hollow tube 14 forward of rod 26 and held in place by bottom pin 16 and top pin 24 which extend through associated holes 24a and 16a. Pull pin 36 will also be seen to extend through associated holes 36a formed on each lateral side of beam 110.

Support beam 110 includes a pair of flanges 112a and 112b connected to its bottom end. As shown, flanges 112a and 112b are generally rectangular in shape and extend rearwardly to hold floating pin 28 in place between them.

Support beam 110 is provided within tube 14 to strengthen and improve the durability of support rack 10 thus allowing the rack to carry loads which might otherwise overburden relatively light weight tube 14. Because both tube 14 and support beam 110 are pinned by the same elements 16 and 24, it will be understood that beam 110 pivots with hollow tube 14 when the support rack is raised or lowered to provide access to the rear of the carrying vehicle. In the preferred embodiment, support beam 110 is formed of steel but it is contemplated that the support beam may also be formed from other metals which are capable of providing the support sought.

It will also be understood that in this embodiment, stop block 32 may be eliminated since when the rack pivots rearwardly the support beam 110 and rod 26 move toward each other such that when they come in contact with each other, further rearward pivoting rotation is prevented.

While the preferred embodiment of the invention has been illustrated and described, it will be appreciated that various changes can be made therein without departing from the spirit and scope of the invention.

The invention claimed is:

1. A pivoting vehicle mounted bicycle rack including a hitch receiver bar, a top plate portion, a first upright having a proximal end pivotally connected to said hitch receiver bar with a first pivot and a distal end pivotally connected to said top plate portion with a second pivot, and a second upright having a proximal end pivotally connected to said hitch receiver bar with a third pivot and a distal end pivotally connected directly to said top plate portion with a fourth pivot, such that said hitch receiver bar, top plate portion, first upright, and second upright form a parallelogram linkage, wherein said first upright is a tubular member and said second upright is a metal rod mounted within said tubular member in substantially parallel relationship with said tubular member;
    said top plate portion including a pair of slots adapted to receive a pair of rearwardly extending bicycle support arms;
    spring loaded pins adapted to removably hold said support arms in said slots; and
    said top plate portion including flanges extending downwardly adjacent the top of said tubular member, said first and second uprights being pivotally connected to said flanges.

2. The pivoting vehicle mounted bicycle rack of claim 1 including a spring loaded pull pin adapted to releasably hold said first and second uprights in an upright position and prevent pivoting thereof, said pull pin extending through said tubular member and through one of said flanges.

3. A pivoting vehicle mounted bicycle rack including a hitch receiver bar, a top plate portion, and first, second, and third uprights, said first, second, and third uprights each having a proximal end pivotally connected to said hitch receiver bar with first pivots and a distal end pivotally connected directly to said top plate portion with second pivots to form a parallelogram linkage, the first of said uprights being a tubular member and the second of said uprights being a metal rod mounted within said tubular member in substantially parallel relationship with said tubular member;
    said third upright being a support beam mounted within said tubular member forwardly of said second upright, said third upright adapted to move substantially parallel with both said first and second uprights, said third upright including a pair of rearwardly extending flanges mounted to said proximal end of said third upright; and
    wherein said first pivot pivotally connecting said second upright to said hitch receiver bar is held in place by an interior wall of said pair of rearwardly extending flanges mounted on said third upright.

4. A vehicle mounted rack comprising a hitch receiver bar including a first portion mountable in a hitch receiver of a vehicle and a second distal portion;
    a hollow tubular upright, an upright rod, and a support beam wherein said upright rod and said support beam are positioned within said hollow tubular upright, said support beam being mounted forwardly of said upright rod;
    a first pivot pivotally mounting both said hollow tubular upright and said support beam to said second distal portion of said hitch receiver bar;
    a second pivot disposed within said hollow tubular upright and spaced rearwardly from said first pivot, said second pivot pivotally mounting said upright rod to said hitch receiver bar;
    a top plate having downwardly extending flanges positioned adjacent to opposite sides of the top of said hollow tubular upright and pivotally connected thereto by a third pivot, wherein the third pivot extends through said flanges, said tubular upright and said upright rod;
    a fourth pivot, wherein said fourth pivot extends through said flanges, said tubular upright, and said support beam, whereby said tubular upright, said upright rod, said top plate, said hitch receiver bar, and said support beam form a parallelogram linkage adapted to pivot rearwardly while said tubular upright, said upright rod, and said support beam remain substantially parallel with each other to maintain said top plate substantially horizontal; and
    rearwardly extending load support arms mounted on said top plate.

* * * * *